United States Patent
Khushu et al.

(10) Patent No.: US 8,265,005 B2
(45) Date of Patent: Sep. 11, 2012

(54) METHOD AND APPARATUS FOR COMMUNICATING WITH A WIRELESS NETWORK USING A SINGLE ADDRESS FOR MULTIPLE PROCESSORS

(75) Inventors: Sanjeev Khushu, San Diego, CA (US); Christopher Patrick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 602 days.

(21) Appl. No.: 11/617,501

(22) Filed: Dec. 28, 2006

(65) Prior Publication Data

US 2007/0206553 A1    Sep. 6, 2007

Related U.S. Application Data

(60) Provisional application No. 60/779,721, filed on Mar. 6, 2006, provisional application No. 60/827,650, filed on Sep. 29, 2006, provisional application No. 60/862,209, filed on Oct. 19, 2006.

(51) Int. Cl.
*H04M 11/00* (2006.01)
*H04W 4/00* (2009.01)

(52) U.S. Cl. .................. 370/328; 455/403; 370/338

(58) Field of Classification Search .................. 370/349, 370/389, 392, 338; 455/403; 709/220, 201
See application file for complete search history.

(56) References Cited

U.S. PATENT DOCUMENTS

| 2002/0073333 | A1  | 6/2002 | Palka et al. |
| 2005/0030940 | A1  | 2/2005 | Abrol et al. |
| 2005/0153725 | A1* | 7/2005 | Naghian et al. ............... 455/520 |
| 2006/0101505 | A1* | 5/2006 | Abdo et al. ........................ 726/2 |
| 2006/0116127 | A1* | 6/2006 | Wilhoite et al. ............... 455/442 |
| 2007/0066275 | A1* | 3/2007 | Nagy et al. ..................... 455/403 |
| 2007/0168440 | A1* | 7/2007 | Cobelens ....................... 709/207 |
| 2009/0207821 | A1* | 8/2009 | Rune ............................. 370/338 |

FOREIGN PATENT DOCUMENTS

| CN | 1331878 A | 1/2002 |
| KR | 1020010093163 | 10/2001 |

(Continued)

OTHER PUBLICATIONS

International Search Report—PCT/US2007/063427, Aug. 24, 2007, International Search Authority/EPO (2 pages).

(Continued)

*Primary Examiner* — George Eng
*Assistant Examiner* — Nizar Sivji
(74) *Attorney, Agent, or Firm* — James D. McFarland; Arnold J. Gum (57) ABSTRACT

A communication system that allows multiple data applications to work simultaneously within a distributed execution environment in which only one IP address is assigned to the mobile system by an external wireless network. The mobile system comprises a wireless communication system with a first processing device (such as a cell phone or a network card) and a second device with another processor (such as a laptop computer or a personal digital assistant). The single IP address is assigned to the second processor, and all incoming external communications are stored in the second processor. In some embodiments the first processing device includes a filter; in other embodiments the second processing device includes a proxy for each processor. Additional processors can be connected to the mobile system by adding an additional filter or additional proxy.

25 Claims, 3 Drawing Sheets

FOREIGN PATENT DOCUMENTS

WO             0025497 A      5/2000
WO         WO0156254 A1      8/2001

OTHER PUBLICATIONS

International Search Report, PCT/US2007/063427, Aug. 16, 2007, EPO-Internal, WPI Data.

Written Opinion of the International Searching Authority, PCT/US2007/063427, European Patent Office, Aug. 16, 2007.

International Preliminary Report on Patentability, PCT/US2007/063427, The International Bureau of WIPO 34 chemin des Colombettes 1211 Geneva 20 Switzerland, Sep. 9, 2008, Beate Giffo-Schmitt.

\* cited by examiner

METHOD AND APPARATUS FOR COMMUNICATING WITH A WIRELESS NETWORK USING A SINGLE ADDRESS FOR MULTIPLE PROCESSORS

CROSS-REFERENCE TO RELATED APPLICATION

Priority is hereby claimed to U.S. Provisional Patent Application No. 60/779,721, filed Mar. 6, 2006, entitled METHOD AND APPARATUS TO ALLOW MULTIPLE DATA APPLICATIONS TO WORK SIMULTANEOUSLY IN A DISTRIBUTED EXECUTION ENVIRONMENT USING A WIRELESS NETWORK, U.S. Provisional Patent Application No. 60/827,650 filed Sep. 29, 2006 entitled METHOD AND APPARATUS FOR SIMULTANEOUSLY OPERATING MULTIPLE DATA APPLICATIONS THAT REQUIRE ACCESS TO A WIRELESS NETWORK, and U.S. Provisional Patent Application No. 60/862,209 filed Oct. 19, 2006, entitled METHOD AND APPARATUS FOR COMMUNICATION WITH A WIRELESS NETWORK USING A SINGLE ADDRESS FOR MULTIPLE PROCESSORS, all of which are incorporated by reference herein in their entirety.

BACKGROUND OF THE INVENTION

1. Field of the Invention

The present invention generally relates to wireless networks, and particularly to mobile systems that have multiple processors that operate multiple data applications which may require wireless network access using a single wireless communication link and a single address.

2. Description of Related Art

Exchanging information between one or more devices is a primary purpose of computer networks. To properly route information from one device to another, each device is assigned an address, and the devices communicate using the assigned addresses. For example, in a typical network, a source device sends packetized data (a series of packets) to a destination using an address assigned to that destination. Upon receipt of the packetized data, the destination sends an acknowledgement to the sender's address.

One widely-used communication protocol is TCP/IP. An IP address is used to route a series of packets from one device to another on the network. In a typical wireless data system, a communication end point is assigned a single IP address. The assigned IP address is then used by one or more networks to route packets through the internet to the particular TCP/IP end point designated by the address.

A cell phone is one example of a mobile station that wirelessly communicates with one or more remote networks for purposes such as uploading and downloading information, and accessing services. Cell phone technology is being improved all the time, adding functionality (e.g., adding position location functions), while at the same time making cell phones smaller and more energy efficient. For these purposes, it may be advantageous to "off-load" some of the processing to external computers and external networks. And, it may be advantageous to store information externally rather than on the cell phone.

It may also be useful to connect a cell phone to another electronic device, such as a portable laptop computer, and provide a network connection through the modem on the cell phone. For purposes herein, the terms "mobile station", or "mobile system", encompasses the cell phone and the electronic devices (e.g., laptop computer) to which it is connected.

As more and more functionality is added to cell phones (for example as features such as GPS are implemented), and more devices may be connected to the cell phone (such as laptop computers) additional communication "end points" are created to exchange data with the network. Unfortunately, because these endpoints are connected with the cell phone, these "endpoints" share a common IP address with the device on which they are located (or the device to which they are connected). Thus, whenever data is received, the common IP address creates confusion as to which of the two (or more) endpoints is intended to receive the data.

For example, if more than one data application is operating in the mobile system (for example if one data application resides on a modem, and another data application resides on the host/application device on a laptop) then there is more than one end point that is assigned the single address. The single address creates confusion as to which of the two end points is the destination. For example in a typical system where only one IP address is assigned to the client (MS) side, the data packets could be routed arbitrarily to the either end application, either on the modem processor or on the host processor. To avoid this problem, some wireless systems implement some form of arbitration that allows only one data application or modem application to operate at any one time. Unfortunately, in that system the non-operating application(s) wait idly until the other operations are complete, wasting time and inefficiently using system resources.

In order to solve the problem of multiple end points, it has been suggested to assign multiple IP addresses to the mobile system. In the example where the mobile system includes a modem and a laptop, this would involve assigning one IP address to a modem, and another IP address to the laptop. However, multiple IP addresses would require device support for IP packet routing (a router-which is very complex and would require significant resources and development) and multiple IP addresses also would require PDSN support, all of which make this approach undesirable.

SUMMARY OF THE INVENTION

A communication system is disclosed that allows multiple data applications to work simultaneously in a distributed execution environment in which only one IP address is assigned to the mobile system. The mobile system comprises a wireless communication system with a first processing device (such as a cell phone with a modem processor or a network card) and a second processing device that has another processor (such as a laptop computer with a data processor or a personal digital assistant). The single IP address is assigned to the second processor, and therefore all incoming external communications are stored in the second processor's TCP/IP stack even though the first processor is directly communicating with the central network. One or more processors can be added to the mobile system.

In one embodiment described herein, a mobile system is disclosed having multiple processors that wirelessly communicate with an external network over a wireless communication link. The system comprises a first processing device including a first processor, a first memory, and a first PPP communication system, and a second processing device connected to the first processing device, including a second memory, a second PPP communication system connected to the first PPP communication system, and a second processor connected to the first processor. A wireless receiver and antenna are connected to the first processing device, so that the first processor communicates with the external network over the wireless communication link using an IP address.

The second processing device is assigned the IP address, and the second memory is configured to directly receive and store wireless communications from the external network.

In some embodiments, the first processor comprises a filter that filters incoming communications and selects a destination in one of the first processor and second processor. In those embodiments, the mobile system may have a first memory is arranged to store communications with the external network, and the filter is configured to monitor incoming communications.

In other embodiments the second processor is configured to define a proxy for the first processor, so that all external communications intended for the first processor are communicated from the second processing device to the first processing device.

In some embodiments, the first processing device includes a GPS receiver and antenna, and the second processing device includes a location-based application that requests position determination using the GPS receiver and antenna.

Additional processors can be connected to the mobile system either by providing additional filters in the first processor, or by setting up additional proxies, and using the single IP address.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

This invention is described in the following description with reference to the Figures, in which like numbers represent the same or similar elements.

Glossary of Terms and Acronyms

The following terms and acronyms are used throughout the detailed description:

CDMA Code division multiple access. A high-capacity digital wireless technology that was pioneered and commercially developed by QUALCOMM Incorporated GPS Global positioning system. A system in which distance measurements to GPS satellites are utilized to determine three-dimensional location (including altitude). Although the term GPS is commonly used to refer to the U.S. Global Positioning System, for purposes of this specification, the meaning of this term includes other global positioning systems, such as the Russian Glonass System and the planned European Galileo System. In some systems, the term Satellite Positioning System (SPS) may be used in substitution for the GPS terminology. For illustrative purposes, the invention herein is described in terms of the current U.S. GPS System. It should be obvious, however, to one skilled in the art that this invention may be applied to a variety of SPS systems that utilize similar signaling formats, as well as to future variations of the U.S. GPS System.

IP Internet protocol

IPC Inter-processor communication

RPC Remote procedure call

LBS Location based services

MS Mobile station, or mobile system

MSM Mobile station modem

OEM Original equipment manufacturer

PDE Position determination entity. A system resource (usually on a remoter server) working in conjunction with one or more GPS reference receivers, capable of exchanging GPS-related information with MS. In MS-Assisted A-GPS session, the PDE can send GPS assistance data to the MS to enhance the signal acquisition process. The MS can return information such as pseudorange measurements back to the PDE, which is then capable of computing the position of the MS. In an MS-Based A-GPS session, the MS can send computed position results to the PDE.

PDM Position determination manager (usually on network side)

PDSN Packet data serving node

PPP point-to-point protocol. Typically a full-duplex link layer protocol used for direct connections. PPP provides a standard way for computers and other processors connected over a link to establish, monitor, and terminate a session, and exchange data in-between.

TCP Transmission control protocol

WAP Wireless access protocol

Overview

A communication system is disclosed that allows multiple data applications to work simultaneously in a distributed execution environment in which only one IP address is assigned to the mobile system. The mobile system comprises a wireless communication system with a first processor (such as a cell phone with a modem processor) and a device with another processor (a second, third, etc. processor) to which it is connected (such as a laptop computer with a data processor). The single IP address is assigned to the second processor (not the first), and therefore all incoming external communications are stored in the second processor's TCP/IP stack even though the first processor is directly communicating with the central network. Regardless, in some embodiments the first processor may monitor the external communications using its own TCP/IP stack.

In one embodiment of the method, all incoming data on the wireless link is monitored and filtered at the first processor, and then directed from the memory (the memory associated with the second processor) to the appropriate processor or application. Advantageously, the filter is defined by programming the first processor, and therefore the filter can be configured and re-configured easily by software, either from within the first processor or responsive to the second processor.

In another embodiment, only the second processor stores data from the network. A proxy is configured in the second processor for each endpoint outside the second processor. For outgoing communications, the data on the modem processor is proxied via the host/application processor and the data on application processor is sent directly over the data link. In this embodiment, when a data application on the first processor requires network access, the connection request is proxied to the second processor which in turn opens the connection. If a data application on that second processor needs a data connection, the connection is directly opened from that processor. As a result there is only one data end point, and hence only one IP address is sufficient to support multiple data applications residing on multiple processors.

Description

Figure 1:
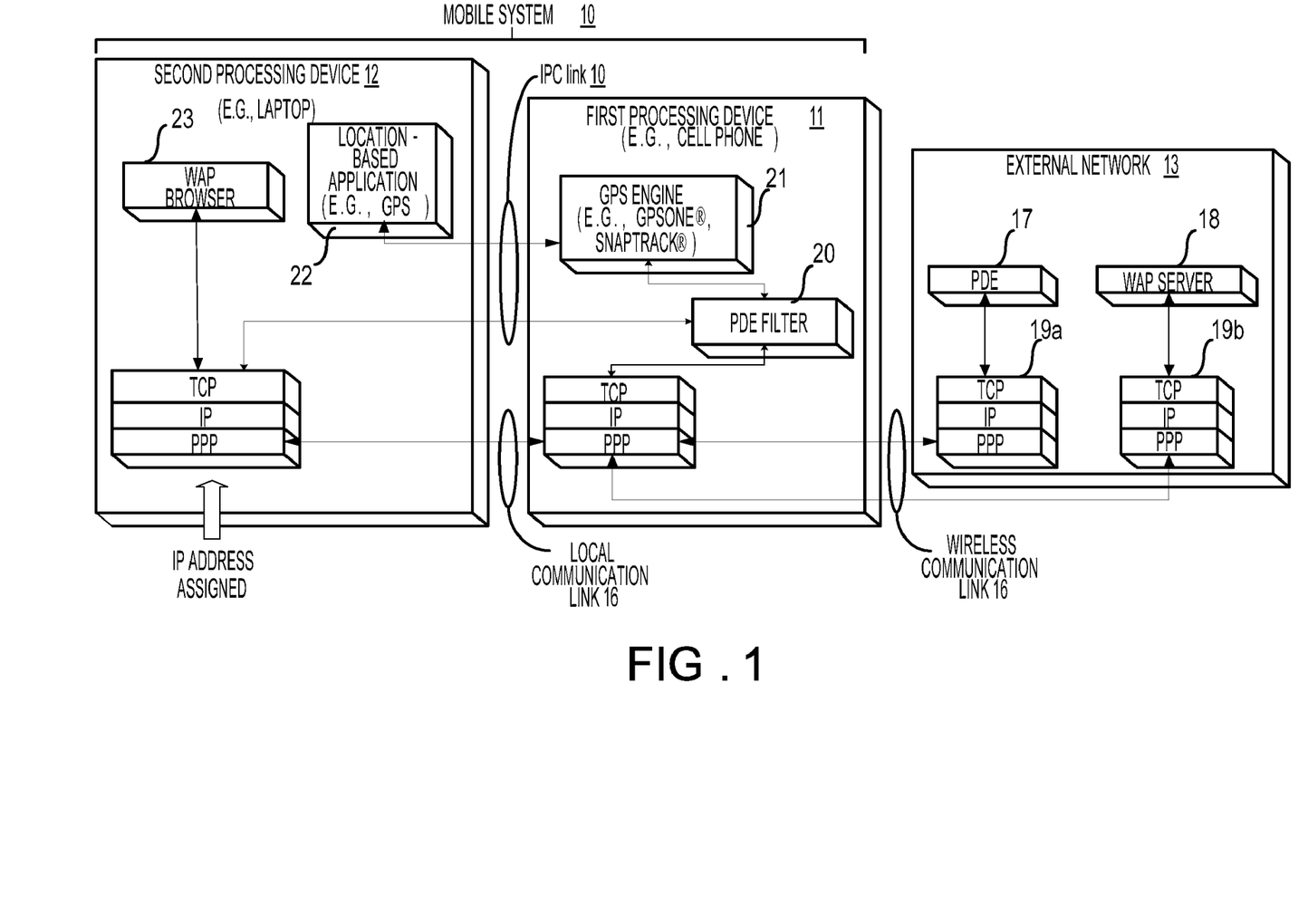
FIG. 1 is a functional block diagram of a mobile system in which the IP address is assigned to the second processor, including a first processing device that has a filter that monitors incoming communications, filters the communication, and directs the incoming communications.

FIG. 1 is a functional block diagram showing a mobile system 10 that includes a first processing device 11 connected to a second processing device 12, both of which are connected (directly or indirectly) to an external network 13 via a wireless communication link 14. For purposes herein, even though the first and second processing devices may be physically separate devices and only the first processing device may have a receiver that communicates directly with the wireless network, the first and second processing devices are considered a single "mobile system" for purposes of this disclosure. For example, the first processing device may form part of a cellphone or a network card, and the second processing device may form part of a laptop computer or a PDA (personal digital assistant).

The first and second processing devices are connected by any suitable connection, such as an inter-processor communication (IPC) link 15 and a PPP local communication link 16. Such communication links are typically "wired", although some embodiments may comprise wireless links, such as a short range Bluetooth link. The first processing device also includes TCP, IP, and PPP stacks connected to communicate with the external network, and the second processing device includes TCP, IP, and PPP stacks connected to communicate with the first processing device.

In general, the mobile system 10 is wirelessly connected to the external network 13 to provide two-way communication between the mobile system and the external network, such as by a receiver (shown in FIG. 3) in the first processing device 11. The external network typically comprises remote servers (e.g., a PDE server 17 and/or a WAP server 18 such as a server that provides location-based services) that communicates using TCP/IP and/or PPP, and therefore one of the communication layers in the wireless link may be a TCP/IP layer that includes TCP, IP, and PPP stacks 19a and 19b. Additional communication layers may comprise CDMA or GSM. Since communication over the wireless link requires the mobile system to have an IP address to which to send the packetized information, an IP address will be assigned to the mobile system 10. The IP address is a single address, and may be assigned to the mobile system by the external network, or by any other suitable system, or the address may be pre-assigned.

The IP address assigned to the mobile system 10 is physically assigned to the second processing device 12, and therefore all incoming communications are directed to the TCP/IP stack of the second processing device. However, since the receiver is physically within the first processing device 11, the first processing device actually receives the packets and then sends them over the PPP local communication link to the second processing device.

In the embodiment shown in FIG. 1, the first processing device includes a filter 20 that monitors and filters incoming communications, and controls to directs the incoming communications according to its desired destination.

In FIG. 1, the first processing device 11 includes processing capabilities 21 (e.g., a GPS engine) that is connected to, and utilized by, a first application 22 (e.g., a GPS engine) in the first processing device. The second processing device 12 also operates a second application 23 (e.g., a WAP browser) both of which may request communication with the external network and operate simultaneously with the first application. It may be noted that each of the first and second processors defines a separate communication endpoint.

In the embodiment of FIG. 1, the external communications on the wireless link are monitored by the first processor. The filter 20 is defined in the first processor to filter these monitored external communications with the second processor. The filter 20 may be defined by software from either processor, for example a programmer may specify a particular filter for a particular application that will ensure that communications are received at the intended destination. Alternatively, or in addition thereto, outgoing communications may be monitored as to the source and destination of communications, and the filter may be configured responsive thereto. For example the filter 20 may be configured so that all communications received from a particular address are sent to the source (within the mobile system) of the outgoing message. Advantageously, because the filter is defined by programming the first processor, the filter can be quickly and easily configured and re-configured by software or by commands from either processor. This advantage allows an embodiment of the system to be implemented with little or no additional hardware cost.

The filter 20 is configured with the first and second processing devices so that the external communications are directed to the appropriate locations. For example, the filter may control the first processor to supply monitored communications to the first application (e.g., to the GPS engine), and to ignore those same communications in the second processor. Alternatively, the filter may control the second processor to direct communications stored in the second processor's TCP/IP stack to the appropriate application, and to ignore the monitored communications in the second processor's TCP/IP stack. In summary, the filter in the first processor monitors and filters the external communications in the first processor, selects a destination as one of the first and second processors, and supplies the received data to the selected destination. Advantageously, additional processors can be added (e.g., a third, fourth, and additional processors can be added), by adding additional PPP links and inter-processor communication links with the added processor and the first processor.

Figure 2:
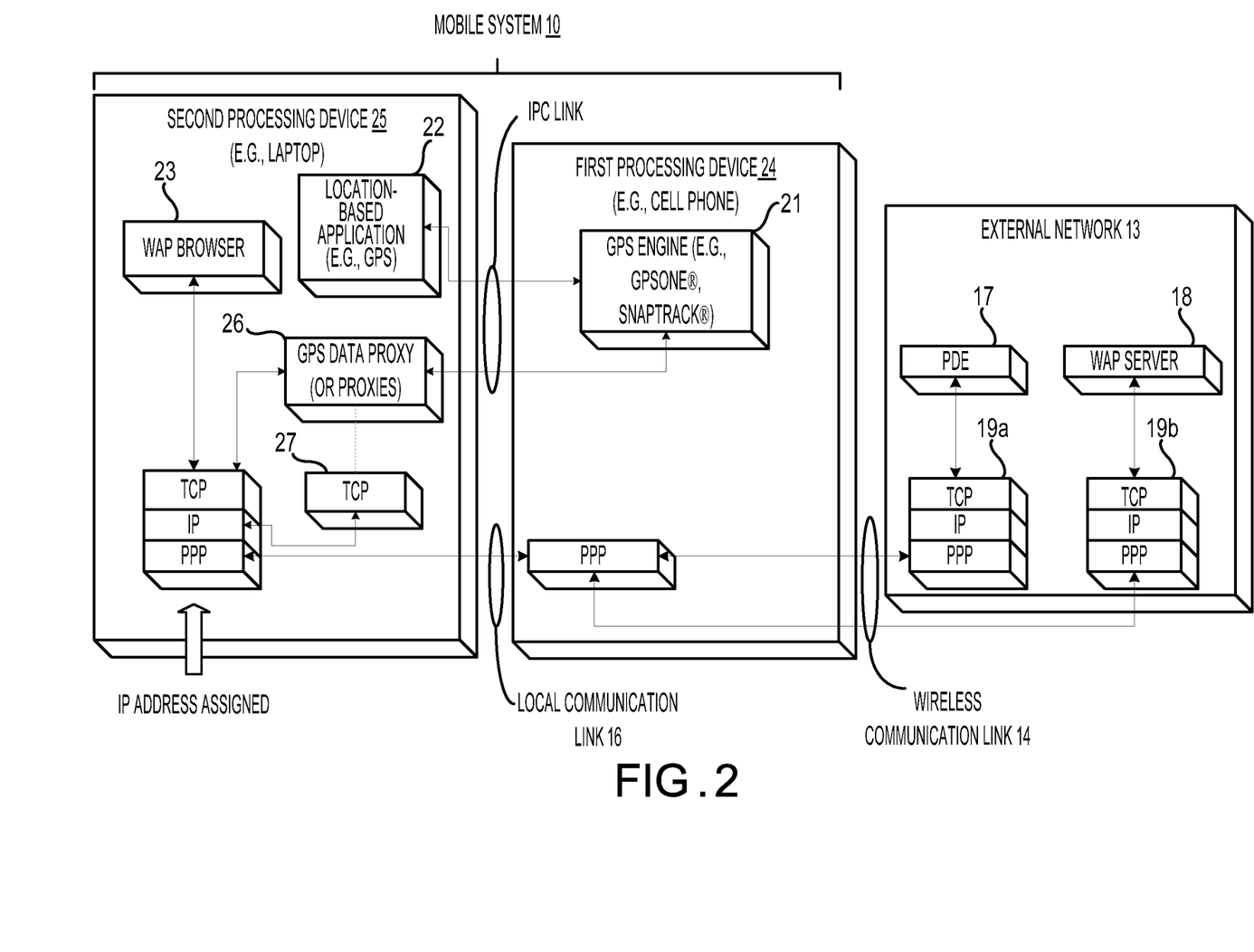
FIG. 2 is a functional block diagram of an alternative embodiment mobile system in which the second processing device is configured with a proxy to direct incoming communications to the appropriate destination.

FIG. 2 is a functional block diagram of an alternative embodiment mobile system in which the second processing device is configured with a proxy to direct incoming communications to the appropriate destination. This proxy system may be used as alternative, or in conjunction with the filter in the first processor. The block diagram of FIG. 2, is similar to FIG. 1, including external network 13 having servers such as the PDE 17 and the WAP server 18, however in FIG. 2 the first processing device 24 and a second processing device 25 have a somewhat different configuration than the first and second processing devices in FIG. 1. A principal difference is that the second processor 25 in FIG. 2 includes one or more proxies 26 configured in the second processor 25 to receive and provide TCP communications and control, and the first processor 24 in FIG. 2 does not include the filter shown in the first processor 12 of FIG. 1. Similar to the arrangement described with respect to FIG. 1, the second processor 25 is assigned the IP address, and all communications from the external network 13 are directed to the TCP/IP stack in the second processor.

In FIG. 2, a first proxy is configured in the second processor, and is one of the destinations to which communications on the TCP/IP stack may be directed. A proxy may be configured in software, and is required for each application running on an external processor, or for each application greater than one on the second processor. To configure a proxy for an application on the first processor, the first and second processors will communicate to establish a proxy for communications intended for an application running on the second processor. The proxy can be understood as appearing as another TCP stack 27 on the second processor 25, but is connected so that an external communications are forwarded through it to the appropriate application on the first processor.

Advantageously, because the proxy 26 is defined by programming the second processor, the proxy can be quickly and easily created by software or by commands from either processor. This advantage allows an embodiment of the system to be implemented with little or no additional hardware cost.

Furthermore, additional proxies can be created as needed for additional applications, even for applications running on other processors. This advantage allows additional processors (e.g., third and fourth processors) to be added while still allowing external network access for each.

In some embodiments, one of the first and second applications may include a GPS application or other location-based application that requests position information or communication with a position determination entity on the external network. The location-based application may also want to communication with the a server on the external network that provides location based services.

Figure 3:
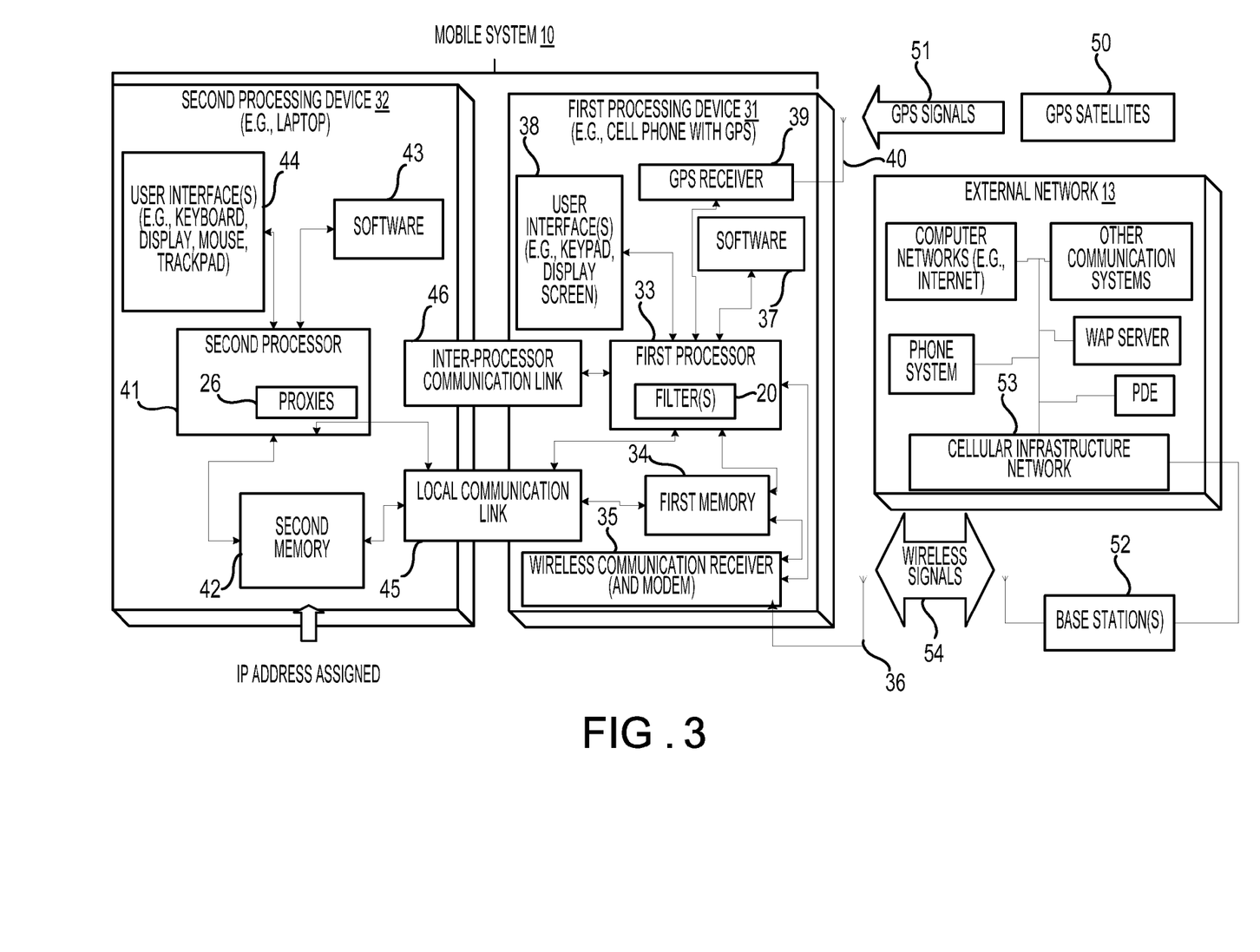
FIG. 3 is a hardware block diagram of a mobile system including a first processing device such as a cellphone and second processing device such as a laptop computer in which a single address can be used for communication.

FIG. 3 is a hardware block diagram of one example of a mobile system including a first processing device such as a cellphone and second processing device such as a laptop computer in which a single address can be used for communication. FIG. 3 is one embodiment; it should be clear that other implementations are possible.

The hardware block diagram of FIG. 3 shows an implementation that includes both the functional block diagrams of FIG. 1 and/or FIG. 2. In other words, the first processing device 31 includes the functions of first processing devices 11 and 24, and the second processing device 32 includes the functions of the second processing devices 12 and 25.

In FIG. 3, the first processing device 31 is shown including a first processor, a first memory 34, a wireless cellular communication system 35 and antenna 36, appropriate software 37, a user interface 38 (e.g. a keypad, display screen), and a GPS receiver connected to an antenna 40. The wireless cellular communication system and antenna are configured within the first processing device, so that the first processor communicates with the external network over the wireless communication link. The cellular communication system comprises suitable devices, such as a modem, hardware, and software for communicating with and/or detecting signals from base stations, and processing transmitted or received information.

The second processing device 32 is connected to the first processing device 31. The second processing device includes a second processor 41 connected to a second memory 42, appropriate software 43 and a user interface 44 such as a keyboard, display, a mouse, and/or a trackpad. A local communication link 45 includes communication systems on the first and second processors that are configured to provide local communication (e.g. PPP). An appropriate inter-processor communication link 46 connects the first processor 33 and second processor 41 to provide high-speed communication between the two processors.

As discussed with reference to FIGS. 1 and 2, the second processing device is assigned the IP address, which may be stored in the second memory 42, and is configured to directly receive and store wireless communications from the external network.

In some embodiments of the mobile system shown in FIG. 3, the first processor 33 comprises one or more filters 20 (see FIG. 1) that filter incoming communications and select a destination in one of the first processor and second processors. In this embodiment the first memory is arranged to store communications with the external network, and the filter is configured to monitor incoming communications.

In other embodiments of the mobile system shown in FIG. 3, the second processor is configured to define one or more proxies 26 (see FIG. 2) for the first processor, so that all external communications intended for the first processor are communicated from the second processing device to the first processing device.

The first and second processing devices and their intercommunication can be implemented in a number of different possible ways. For example the first processing device may be a cellphone or a network card, and the second processing device may be a laptop computer or a personal digital assistant. The first processing device may utilize any appropriate combination of wireless communication systems such as TCP/IP communication, CDMA, and GSM to communication with the external network. Also, in this embodiment the first processing device includes a GPS receiver and antenna, and the second processing device include a location-based application (in software) that requests position determination using the GPS receiver and antenna; other implementations may not include these systems, or may have other appropriate configurations.

FIG. 3 also shows a plurality of GPS satellites 50 that emit GPS positioning signals 51, and a plurality of land-based base stations 52. The GPS satellites 50 comprise any group of satellites broadcasting signals that are utilized for positioning a GPS receiver, such as the U.S. Global Positioning System, the Russian Glonass System and the European Galileo System. Particularly, the satellites are synchronized to send wireless positioning signals phased to GPS time. These positioning signals are generated at a predetermined frequency, and in a predetermined format.

The base stations 52 are connected to a cellular infrastructure network 53 in the external network 13, which allows it to communicate with other networks and communication systems networked in the external network, such as a phone system, computer networks (e.g., the internet), and other communication systems. Thus, the base stations 52 may comprise part of a communication network that may include a number of additional communication systems in communication with the base stations. The base stations 52 communicate with one or more first processing devices 31 using wireless signals 54.

More specifically, the base stations comprise any collection of base stations utilized as part of a communication network that communicates with the mobile system using wireless signals. The base stations are connected to the cellular infrastructure network, which provides communication services with a plurality of other communication networks such as a public phone system, computer networks such as the internet, a position determination entity (PDE), and a variety of other communication systems. The PDE may be connected to (or include) a GPS reference receiver (not shown) that communicates with the PDE to provide useful information in determining position, such as satellite position (ephemeris) information. In addition, the external network may have include a server or other entity that provides location-based services, such as geographical or business information based upon the location of the mobile system.

The ground-based cellular infrastructure network typically provides communication services that allow the user of a cell phone to connect to another phone over the phone system; however the base stations could also be utilized to communicate with other devices and/or for other communication purposes, such as an internet connection with a handheld personal digital assistant (PDA). In one embodiment, the base stations are part of a GSM communication network; however, in other embodiments other types of synchronous (e.g., CDMA2000) or asynchronous communication networks may be used.

As discussed above, the GPS receiver 39 in the first processing unit is connected to the antenna 40 to receive positioning signals transmitted from GPS satellites 50. The GPS system in the first processing device comprises any suitable hardware and software for receiving and processing GPS signals and for performing calculations. In some assisted GPS implementations the final position location calculations (e.g., latitude and longitude) are performed at a remote server such as the PDE, based upon code phases and other information sent from the GPS receiver to the remote server. These implementations are called MS-assisted.

In FIG. 3, a separate GPS antenna 40 is used to receive GPS positioning signals. However, in some embodiments, a single antenna can be used to support multiple bands such as cellular, GPS and PCS. Some examples of GPS systems are disclosed in U.S. Pat. Nos. 5,841,396, 6,002,363, and 6,421,002, by Norman F. Krasner.

The processing devices described herein may include one or more microprocessors, memory, other hardware, firmware, and software to provide appropriate control functions for the systems to which they are connected. It should be apparent that the processing steps described herein can be implemented in any suitable manner using hardware, software, and/or firmware, subject to control by the microprocessor.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A method for using a single IP address to wirelessly communicate between an external network and a mobile system that includes at least a first processor operating a first application and a second processor operating a second application both of which are operable to request communication with the external network and operate simultaneously, the first and second processors defining separate first and second communication endpoints respectively, the method comprising:
    establishing a wireless communication link between the external network and the mobile system, including obtaining an IP address from the external network;
    establishing a local communication link and an inter-processor communication link between the first processor and the second processor in the mobile system;
    associating the IP address with the second processor and the second endpoint, so that external communications to the IP address are directed to the second endpoint;
    configuring the first processor to filter external communications with the second endpoint, including configuring a filter in the first processor to filter external communications received over the wireless communication link;
    communicating with the external network using said IP address associated with said second endpoint; and
    monitoring and filtering said external communications in the first processor, including selecting a destination as one of the first and second processors, and supplying received data to the selected destination.

2. The method of claim 1, wherein the mobile system comprises one of a cell phone and a network card connected to the external network, and one of a laptop computer and a PDA connected to the cell phone via the local communication link.

3. The method of claim 2 wherein the cell phone comprises the first processor, and the laptop computer comprises the second processor.

4. The method of claim 1 wherein the wireless communication link comprises at least one of TCP/IP communication, CDMA, and GSM.

5. The method of claim 1 wherein one of the first and second applications comprises a GPS application that determines position, and including the step of the GPS application requesting communication with a position determination entity that is on the external network.

6. The method of claim 1 wherein one of the first and second applications comprises a location-based services application, and including the step of communicating with a location based entity to provide location-based information to the location-based services application.

7. A method for using a single IP address to wirelessly communicate between an external network and a mobile system that includes at least a first processor operating a first application and a second processor operating a second application both of which are operable to request communication with the external network and operate simultaneously, the first and second processors defining separate first and second communication endpoints respectively, the method comprising:
    establishing a wireless communication link between the external network and the mobile system, including obtaining an IP address from the external network;
    establishing a local communication link and an inter-processor communication link between the first processor and the second processor in the mobile system;
    associating the IP address with the second processor and the second endpoint, so that external communications to the IP address are directed to the second endpoint;
    operating a first application in the first processor that may require external network access;
    configuring a first proxy in the second processor to select external communications whose destination is the first application; and
    responsive to external communications selected by the first proxy, forwarding said selected communications to the first processor.

8. The method of claim 7, wherein the mobile system comprises one of a cell phone and a network card connected to the external network, and one of a laptop computer and a PDA connected to the cell phone via the local communication link.

9. The method of claim 8 wherein the cell phone comprises the first processor, and the laptop computer comprises the second processor.

10. The method of claim 7 wherein the wireless communication link comprises at least one of TCP/IP communication, CDMA, and GSM.

11. The method of claim 7 wherein one of the first and second applications comprises a GPS application that determines position, and including the step of the GPS application requesting communication with a position determination entity that is on the external network.

12. The method of claim 7 wherein one of the first and second applications comprises a location-based services application, and including the step of communicating with a location based entity to provide location-based information to the location-based services application.

13. A mobile system having multiple processors that wirelessly communicate with an external network over a wireless communication link, comprising:
  a first processing device including a first processor, a first memory, and a first point-to-point protocol (PPP) communication system;
  a second processing device connected to the first processing device, including a second memory, a second PPP communication system connected to the first PPP communication system, and a second processor connected to the first processor;
  an inter-processor communication link providing a high-speed communication link between the first processor and the second processor; and
  a wireless receiver and antenna connected to the first processing device, so that the first processor communicates with the external network over the wireless communication link using an Internet Protocol (IP) address;
  wherein the IP address is associated with the second processing device, and said second memory of the second processing device is configured to directly receive and store wireless communications from the external network.

14. The mobile system of claim 13 wherein the first processor comprises a filter that filters incoming communications and selects a destination in one of the first processor and second processor.

15. The mobile system of claim 14 wherein the first memory is arranged to store communications with the external network, and said filter is configured to monitor incoming communications.

16. The mobile system of claim 13 wherein the second processor is configured to define a proxy for the first processor, so that all external communications intended for the first processor are communicated from the second processing device to the first processing device.

17. The mobile system of claim 13 wherein the first processing device includes a GPS receiver and antenna, and the second processing device includes a location-based application that requests position determination using said GPS receiver and antenna.

18. The mobile system of claim 13 wherein the first processing device is one of a cell phone and a network card.

19. The mobile system of claim 13 wherein the second processing device is one of a laptop computer and a personal digital assistant.

20. A mobile system configured to use a single IP address to wirelessly communicate between an external network and the mobile system, the mobile system including at least a first processor operating a first application and a second processor operating a second application both of which are operable to request communication with the external network and operate simultaneously, the first and second processors defining separate first and second communication endpoints respectively, the mobile system comprising:
  means for establishing a wireless communication link between the external network and the mobile system, including obtaining an IP address from the external network;
  means for establishing a local communication link and an inter-processor communication link between the first processor and the second processor in the mobile system;
  means for associating the IP address with the second processor and the second endpoint, so that external communications to the IP address are directed to the second endpoint;
  means for configuring the first processor to filter external communications with the second endpoint, including configuring a filter in the first processor to filter external communications received over the wireless communication link;
  means for communicating with the external network using said IP address associated with said second endpoint; and
  means for monitoring and filtering said external communications in the first processor, including selecting a destination as one of the first and second processors, and supplying received data to the selected destination.

21. A mobile system configured to use a single IP address to wirelessly communicate between an external network and the mobile system, the mobile system including at least a first processor operating a first application and a second processor operating a second application both of which are operable to request communication with the external network and operate simultaneously, the first and second processors defining separate first and second communication endpoints respectively, the mobile system comprising:
  means for establishing a wireless communication link between the external network and the mobile system, including obtaining an IP address from the external network;
  means for establishing a local communication link and an inter-processor communication link between the first processor and the second processor in the mobile system;
  means for associating the IP address with the second processor and the second endpoint, so that external communications to the IP address are directed to the second endpoint;
  means for operating a first application in the first processor that may require external network access,
  means for configuring a first proxy in the second processor to select external communications whose destination is the first application; and
  means for responding to external communications selected by the first proxy by forwarding said selected communications to the first processor.

22. The mobile system of claim 13,
  wherein the first and second processing devices each have independent protocol stacks, and
  wherein the assignment of the IP address to the second processing device causes incoming wireless communications received at the first processing device to be re-directed to the protocol stack at the second processing device instead of the protocol stack at the first processing device.

23. The mobile system of claim 13, wherein the first and second processing devices are physically separate devices.

24. The mobile system of claim 13, wherein the first and second processing devices are structurally independent of each other.

25. The mobile system of claim 13, wherein, if the first and second processing devices are disconnected from each other, the first and second processing deices are capable of independently communicating with the external network using different IP addresses.

* * * * *